United States Patent
Hata et al.

(10) Patent No.: US 10,029,935 B2
(45) Date of Patent: Jul. 24, 2018

(54) AMORPHOUS ALLOY MOLDING DIE AND METHOD FOR FORMING OPTICAL ELEMENT

(71) Applicant: CANON KABUSHIKI KAISHA, Tokyo (JP)

(72) Inventors: Seiichi Hata, Yokohama (JP); Satoko Midorikawa, Machida (JP); Hirotaka Fukushima, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/842,215

(22) Filed: Sep. 1, 2015

(65) Prior Publication Data

US 2016/0068422 A1    Mar. 10, 2016

(30) Foreign Application Priority Data

Sep. 4, 2014 (JP) .................. 2014-180509
Sep. 4, 2014 (JP) .................. 2014-180510
Sep. 4, 2014 (JP) .................. 2014-180511

(51) Int. Cl.
*C03B 11/08* (2006.01)
*C22C 45/00* (2006.01)
(Continued)

(52) U.S. Cl.
CPC ............ *C03B 11/086* (2013.01); *C03B 40/00* (2013.01); *C22C 5/04* (2013.01); *C22C 27/02* (2013.01);
(Continued)

(58) Field of Classification Search
CPC ......... C22C 45/10; C22C 45/00; C22C 30/00; C03B 11/086; C03B 40/00; C03B 40/57;
(Continued)

(56) References Cited

U.S. PATENT DOCUMENTS 3,150,971 A * 9/1964 Weisert .................. C22C 27/04
  420/430
3,779,745 A * 12/1973 Rudy ..................... C22C 1/1068
  148/404

(Continued)

FOREIGN PATENT DOCUMENTS

JP  H03-072055 A   3/1991

OTHER PUBLICATIONS

Huhn, William Paul and Widom, Michael, "First-principle calculation of elastic moduli of early-late transition metal alloys", Physical Review B, vol. 89, pp. 104103-1-104103-10 (2014).

*Primary Examiner* — Queenie S Dehghan
(74) *Attorney, Agent, or Firm* — Canon U.S.A. Inc., IP Division

(57) ABSTRACT

An amorphous alloy contains Ni and Nb and has a composition including at least one of: a composition containing Nb with a content in the range of 35.6 atomic % to 75.1 atomic %, Ir with a content in the range of 7.2 atomic % to 52.3 atomic %, and Ni with a content in the range of 4.0 atomic % to 48.5 atomic %; a composition containing Nb with a content in the range of 19.6 atomic % to 80.9 atomic %, Re with a content in the range of 7.4 atomic % to 59.2 atomic %, and Ni with a content in the range of 4.1 atomic % to 56.9 atomic %; and a composition containing Nb with a content in the range of 7.5 atomic % to 52.9 atomic %, W with a content in the range of 16.4 atomic % to 47.0 atomic %, and Ni with a content in the range of 22.0 atomic % to 53.3 atomic %.

6 Claims, 3 Drawing Sheets

(51) Int. Cl.
*C22C 45/10* (2006.01)
*C22C 30/00* (2006.01)
*C03B 40/00* (2006.01)
*C22C 5/04* (2006.01)
*C22C 27/02* (2006.01)

(52) U.S. Cl.
CPC .............. *C22C 30/00* (2013.01); *C22C 45/00* (2013.01); *C22C 45/10* (2013.01); *C03B 2215/03* (2013.01); *C03B 2215/12* (2013.01); *C03B 2215/16* (2013.01); *C03B 2215/31* (2013.01); *C03B 2215/32* (2013.01); *C03B 2215/34* (2013.01); *Y02P 40/57* (2015.11)

(58) Field of Classification Search
CPC ............ C03B 2215/34; C03B 2215/16; C03B 2215/12; C03B 2215/31; C03B 2215/32; C03B 2215/03
See application file for complete search history.

(56) References Cited

U.S. PATENT DOCUMENTS

| | | | | |
|---|---|---|---|---|
| 4,059,441 | A | * 11/1977 | Ray | C22C 45/10 148/403 |
| 4,629,487 | A | 12/1986 | Monji | |
| 5,628,807 | A | * 5/1997 | Yoshitake | C03B 9/48 65/26 |
| 7,360,488 | B2 * | 4/2008 | Stawovy | F42B 1/032 102/306 |
| 8,100,318 | B1 * | 1/2012 | Bose | B23K 20/028 228/193 |
| 2009/0236494 | A1 | 9/2009 | Hata | |

* cited by examiner

AMORPHOUS ALLOY MOLDING DIE AND METHOD FOR FORMING OPTICAL ELEMENT

BACKGROUND OF THE INVENTION

Field of the Invention

The present disclosure relates to an amorphous alloy, a molding die using the amorphous alloy, used for forming molded articles such as camera lenses, and a method for forming an optical element using the molding die.

Description of the Related Art

Press molding of glass material, which can be performed in a simple process without requiring cutting or polishing operation, can be applied to a process for forming optical elements. Accordingly, optical lenses, prisms and other optical elements have come to be formed by press molding.

The material of molding dies used for press molding of glass optical elements is required to have heat resistance, corrosion resistance, hardness, and releasability.

Many molding dies have been devised. For example, U.S. Pat. No. 4,629,487 discloses a molding die or mold formed in a desired shape of a cemented carbide that is hard and resistant to heat and oxidation, and coated with a releasing film of a chemically stable noble metal capable of releasing glass material therefrom.

On the other hand, various types of glass material have come to be used for a variety of optical designs. Some of the glass materials contain a reactive component, such as phosphorus or fluorine. For molding such a glass material, it is desirable the die have a releasing film unreactive with corrosive components released from the glass material. U.S. Patent Laid-Open No. 2009-0236494 discloses a molding die using a corrosion-resistant amorphous alloy for molding glass.

This corrosion-resistant amorphous alloy is chemically stable, but is not hard because it is intended for a layer to be cut. The present inventors measured some alloys expected to have high hardness selected from the amorphous alloys disclosed in U.S. Patent Laid-Open No. 2009-0236494. The hardest amorphous alloy of them had the composition of 58 atomic % of Pt, 21 atomic % of Hf, 12 atomic % of Zr, and 10 atomic % of Ni, and the hardness of this amorphous alloy was 9 GPa.

In the process of molding glass, super-hard powder produced from super-hard members used in the molding die or the molding apparatus by rubbing of the super-hard members at a sliding portion. The hardness of super-hard members used in molding dies is generally about 13 GPa to 18 GPa. If glass is molded with a molding die on which super-hard powder from a sliding portion is deposited, the super-hard powder will be strongly pressed on the molding die by glass material. At this time, if the die is coated with a film having a hardness of about 9 GPa as the releasing film disclosed in U.S. Patent Laid-Open No. 2009-0236494 has, the coating film can be damaged or scratched by the super-hard powder. If glass optical elements are formed with such a damaged molding die, the scratches in the molding die are transferred to the glass optical elements, thus resulting in poor appearance of the glass optical elements.

SUMMARY OF THE INVENTION

The present disclosure provides a chemically stable, corrosion-resistant, hard amorphous alloy, and a molding die using the amorphous alloy that is not easily damaged during molding operation. The present disclosure also provides a method for forming an optical element using the molding die.

According to an aspect of the disclosure, an amorphous alloy containing Ni and Nb is provided. The amorphous alloy has a composition including at least one of: a composition containing Nb with a content in the range of 35.6 atomic % to 75.1 atomic %, Ir with a content in the range of 7.2 atomic % to 52.3 atomic %, and Ni with a content in the range of 4.0 atomic % to 48.5 atomic %; a composition containing Nb with a content in the range of 19.6 atomic % to 80.9 atomic %, Re with a content in the range of 7.4 atomic % to 59.2 atomic %, and Ni with a content in the range of 4.1 atomic % to 56.9 atomic %; and a composition containing Nb with a content in the range of 7.5 atomic % to 52.9 atomic %, W with a content in the range of 16.4 atomic % to 47.0 atomic %, and Ni with a content in the range of 22.0 atomic % to 53.3 atomic %.

According to another aspect of the disclosure, there is provided a molding die including a die base and a releasing layer on the die base. The releasing layer is made of an amorphous alloy having a composition including at least one of: a composition containing Nb with a content in the range of 35.6 atomic % to 75.1 atomic %, Ir with a content in the range of 7.2 atomic % to 52.3 atomic %, and Ni with a content in the range of 4.0 atomic % to 48.5 atomic %; a composition containing Nb with a content in the range of 19.6 atomic % to 80.9 atomic %, Re with a content in the range of 7.4 atomic % to 59.2 atomic %, and Ni with a content in the range of 4.1 atomic % to 56.9 atomic %; and a composition containing Nb with a content in the range of 7.5 atomic % to 52.9 atomic %, W with a content in the range of 16.4 atomic % to 47.0 atomic %, and Ni with a content in the range of 22.0 atomic % to 53.3 atomic %.

According to still another aspect of the disclosure, a method for forming an optical element is provided. The method includes molding a glass preform into a shape by pressing using a molding die including a die base and a releasing layer made of an amorphous alloy on the die base. The amorphous alloy has a composition including at least one of: a composition containing Nb with a content in the range of 35.6 atomic % to 75.1 atomic %, Ir with a content in the range of 7.2 atomic % to 52.3 atomic %, and Ni with a content in the range of 4.0 atomic % to 48.5 atomic %; a composition containing Nb with a content in the range of 19.6 atomic % to 80.9 atomic %, Re with a content in the range of 7.4 atomic % to 59.2 atomic %, and Ni with a content in the range of 4.1 atomic % to 56.9 atomic %; and a composition containing Nb with a content in the range of 7.5 atomic % to 52.9 atomic %, W with a content in the range of 16.4 atomic % to 47.0 atomic %, and Ni with a content in the range of 22.0 atomic % to 53.3 atomic %.

Further features of the present invention will become apparent from the following description of exemplary embodiments with reference to the attached drawings.

DESCRIPTION OF THE EMBODIMENTS

Figure 1:
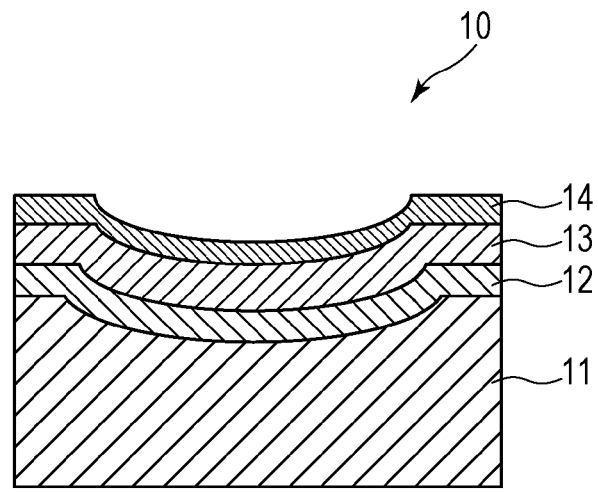
FIG. 1 is a schematic view of a molding die according to an embodiment of the present disclosure.

The amorphous alloy of an embodiment of the present disclosure contains Ni and Nb and has a hardness as high as 13 GPa or more. The amorphous alloy of a first embodiment contains Nb, Ir and Ni. The amorphous alloy of a second embodiment contains Nb, Re and Ni. The amorphous alloy of a third embodiment contains Nb, W and Ni.

First Embodiment

A first embodiment relates to an amorphous alloy, a molding die used for forming an optical element, such as a lens and a prism, by press molding of a glass material, and a method for forming an optical element.

The present embodiment will now be described in detail.

Amorphous Alloy

The amorphous alloy of the first embodiment contains Nb, Ir and Ni. In this amorphous alloy, the Nb content is in the range of 35.6 atomic % to 75.1 atomic %, the Ir content is in the range of 7.2 atomic % to 52.3 atomic %, and the Ni content is in the range of 4.0 atomic % to 48.5 atomic %. The amorphous alloy of the first embodiment has a high hardness. Desirably, the amorphous alloy contains Nb with a content in the range of 35.6 atomic % to 75.1 atomic %, Ir with a content in the range of 21.5 atomic % to 52.3 atomic %, and Ni with a content in the range of 4.0 atomic % to 48.5 atomic %. The unit "atomic %" used herein represents atomic composition in percentage.

More desirably, the amorphous alloy of the first embodiment contains Nb with a content in the range of 37.4 atomic % to 72.4 atomic %, Ir with a content in the range of 18.0 atomic % to 52.3 atomic %, and Ni with a content in the range of 4.0 atomic % to 25.6 atomic %. The amorphous alloy having such a composition has a high hardness and is resistant to heat and corrosion.

Since the amorphous alloy of the first embodiment mainly contains a Nb—Ni alloy, the film thereof has a eutectic point and a high crystallization temperature and is therefore stably amorphous. Furthermore, the film of this amorphous alloy is resistant to corrosive components, such as fluorine, and heat and has a high hardness. Also, the amorphous alloy contains Ir, which has a negative enthalpy of mixing with Nb and a comparatively larger atomic radius than Ni. Consequently, the amorphous alloy of the first embodiment is highly resistant to corrosion and heat and has a high hardness.

Advantageously, the sum of the contents of Nb, Ir and Ni is in the range of 97.0 atomic % to 100 atomic %, preferably in the range of 99.0 atomic % to 100 atomic %, and more preferably in the range of 99.8 atomic % to 100 atomic %. The amorphous alloy of the first embodiment may contain inevitable impurities, such as Fe. The content of inevitable impurities other than oxygen in the amorphous alloy is desirably 0.2 atomic % or less, and more desirably 0.03 atomic % or less.

Molding Die

The molding die of the first embodiment includes a releasing layer made of the above-described amorphous alloy. This molding die is chemically stable and highly releasable and has a high hardness, and is accordingly unlikely to be damaged or scratched when used for molding.

The releasing layer of the molding die is made of the amorphous alloy having the above-described composition, and the amorphous alloy has a hardness higher than or equal to that of cemented carbide.

The releasing layer of the molding die of the first embodiment may contain other elements than Nb, Ir and Ni. Such elements may derive from inevitable impurities, such as a trace of impurities contained in the targets and particles or residual gas in the deposition chamber. If the amorphous alloy film is formed by vacuum deposition, oxygen may be trapped in the film during deposition by residual gas, such as moisture, in the vacuum chamber. Although the amorphous alloy film is ideally free from oxygen, a trace of oxygen may be trapped in the amorphous alloy of the releasing layer even though the chamber is evacuated for a long time or gas adsorbed to the inner walls of the chamber is reduced by baking. The releasing layer of the amorphous alloy of the first embodiment is amorphous (non-crystalline) as required and has a desired hardness even if it contains such inevitable oxygen.

The first embodiment will be further described in detail with reference to the drawings.

FIG. 1 is a schematic view of a molding die according to the first embodiment of the present disclosure. The molding die 10 shown in FIG. 1 includes a die base 11, an adhesion layer 12 on the die base 11, a protective layer 13 on the adhesion layer 12, and a releasing layer 14 on the protective layer 13. The die base 11 may be made of a cemented carbide that is sintered tungsten carbide, or a ceramic, such as SiC. The adhesion layer 12 may be made of Ti or Cr. The protective layer 13 may be made of a metal nitride, such as TiN, CrN or TiAlN. The releasing layer 14 is made of the Nb—Ir—Ni amorphous alloy of the first embodiment.

Figure 2:
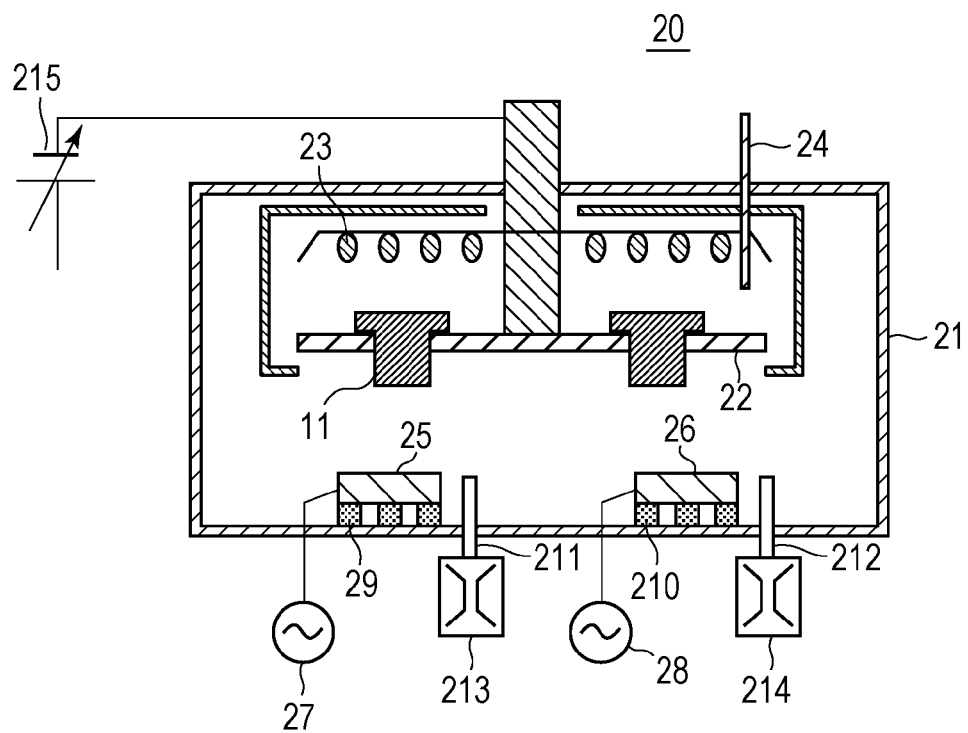
FIG. 2 is a representation of a sputtering apparatus used for, for example, forming an amorphous alloy coating or depositing a Ti layer 12.

The adhesion layer 12, the protective layer 13 and the releasing layer 14 are formed in that order on the die base 11 by physical deposition, such as sputtering. The releasing layer 14 having a desired composition can be formed by sputtering using a target having a desired composition, or multi-target sputtering performed in a sputtering apparatus 20 as shown in FIG. 2 using a plurality of targets 25 and 26. As an alternative to sputtering, other physical deposition may be applied, such as ion plating, arc plasma deposition, or ion beam sputtering.

Alternatively, the alloy film of the releasing layer may be formed in a bulk state with the same properties by melting and mixing the metal materials and then rapidly cooling the mixed metal, instead of the deposited film.

Figure 3:
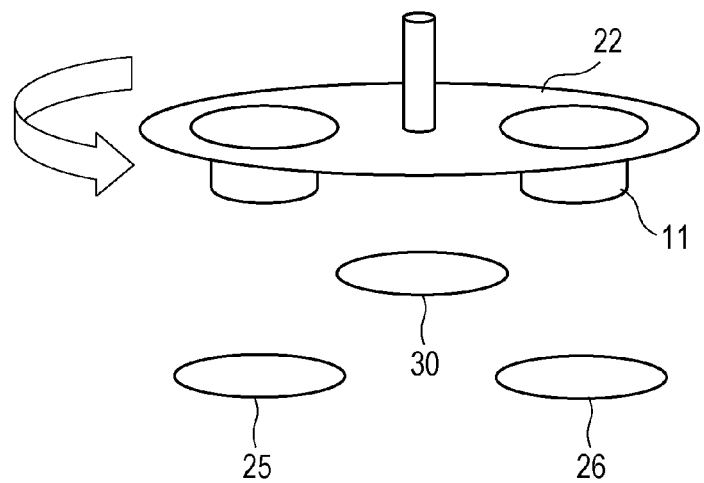
FIG. 3 is a schematic view of the interior of the chamber of a sputtering apparatus used for, for example, forming an amorphous alloy coating or depositing a Ti layer 12.
Figure 4:
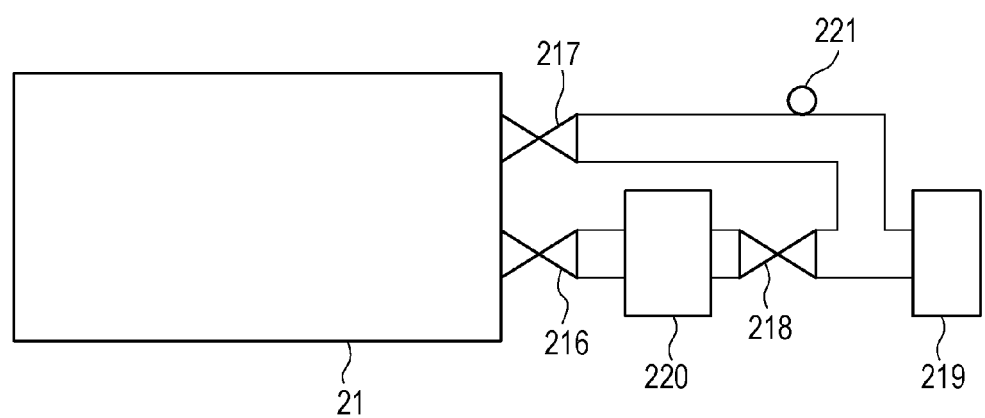
FIG. 4 is a schematic view illustrating the evacuation of a sputtering apparatus used for, for example, forming an amorphous alloy coating or depositing a Ti layer 12.

FIGS. 2, 3 and 4 are representations of a sputtering apparatus used for deposition of the amorphous alloy releasing layer 14, the adhesion layer 12 and the protective layer 13. A process for depositing the releasing layer 14 of the amorphous alloy on a structure including a Ti adhesion layer 12 and a TiN protective layer 13 will now be described with reference to FIGS. 2, 3 and 4.

As shown in FIG. 2, the sputtering apparatus 20 includes a vacuum chamber 21, a substrate holder 22 in the vacuum chamber 21, a halogen lamp heater 23, and a thermocouple thermometer 24. Also, the sputtering apparatus 20 contains a Nb sputtering target 25 and an Ir sputtering target 26. For using three or more sputtering targets, a Nb sputtering target 25, an Ir sputtering target 26, and a Ni sputtering target 30 are circularly arranged as shown in FIG. 3. The sputtering apparatus 20 is provided with an RF power supply 27 for the Nb sputtering target, an RF power supply 28 for the Ir sputtering target, and an RF power supply (not shown) for the Ni sputtering target. Furthermore, the sputtering apparatus 20 includes a magnet 29 for the Nb sputtering target, a magnet 210 for the Ir sputtering target, and a magnet (not shown) for the Ni sputtering target. The sputtering apparatus 20 also includes an Ar gas supply line 211 for the Nb sputtering target, an Ar gas supply line 212 for the Ir sputtering target, and an Ar gas supply line (not shown) for the Ni sputtering target. Furthermore, the sputtering apparatus 20 is equipped with a mass flow controller 213 for the Nb sputtering target, a mass flow controller 214 for the Ir sputtering target, and a mass flow controller (not shown) for the Ni sputtering target. Also, a DC bias supply 215 is provided for the substrate holder 22.

The vacuum chamber 21 has a two-step evacuation system as shown in FIG. 4. The vacuum chamber 21 is connected to a dry pump 219 through a valve 217. A vacuum gauge 221 is disposed in the line between the valve 217 and the dry pump 219. The vacuum chamber 21 is also connected to a turbo-molecular pump 220 through another valve 216. The turbo-molecular pump 220 is connected to the dry pump 219 through a valve 218.

For producing the molding die of the first embodiment, the die base 11 that has been worked into a desired shape is placed on or set in the substrate holder 22. At this time, the Ti sputtering target (not shown) is first set as a sputtering target, and then, the vacuum chamber 21 is evacuated by starting the dry pump 219 and opening the valve 217. After ensuring with the vacuum gauge 221 that the vacuum chamber 21 has been roughly evacuated to a predetermined vacuum of several pascals by the dry pump 219, valve 217 is closed, and the turbo-molecular pump 220 is started for full evacuation of the vacuum chamber 21 with valves 218 and 216 opened. The vacuum chamber 21 may be provided with a load lock chamber (not shown) so as to be prevented from being opened to the atmosphere when dies are set therein.

Then, the halogen lamp heater 23 is turned on to emit infrared light that heats die bases 11 and the substrate holder 22. The temperature of the die bases 11 and the substrate holder 22 is controlled with the thermocouple thermometer 24 positioned near the halogen lamp heater 23. The temperature fluctuation read by the thermocouple thermometer 24 is always reflected to the power input to the halogen lamp heater 23 so that the temperature is stabilized to a desired temperature.

Next, after the vacuum chamber 21 has been evacuated to a vacuum in the first half of the order of $10^{-5}$ pascals, the internal pressure of the vacuum chamber 21 is kept about 0.2 Pa to 1 Pa by introducing Ar gas into the vacuum chamber 21 through the mass flow controller 213, in order to minimize the amount of residual gas trapped in the deposited film from the vacuum chamber 21. Then, power is applied to the target 25 from the RF power supply 27. For plasma discharge, a gas trigger is applied for several hundreds of milliseconds using the mass flow controller 213 so as to increase the pressure in the vacuum chamber 21 to several pascals. Thus the plasma discharge causes the Ti target (not shown) to release a deposition material, and the material is deposited on the surfaces of the die bases 11. For this operation, it is advantageous to perform pre-sputtering to remove the titanium oxide layer from the surface of the Ti target in advance. This pre-sputtering is performed by making a plasma discharge in a state where, for example, a shatter (not shown) disposed over the target is closed so that deposition is not made on the die bases 11. In addition, a bias voltage is applied to the substrate holder 22 and the die bases 11 from the power supply 215 so that Ar ions produced by the plasma discharge are hit against the deposited film, thus increasing the density of the deposited film and the adhesion of the film with the die base. The thickness of the Ti film 12 can be controlled by varying the deposition time.

After the deposition of the Ti film, the pressure in the vacuum chamber 21 is kept about 0.2 Pa to 1 Pa by introducing a mixed gas of Ar and $N_2$ into the vacuum chamber 21 through the mass flow controller 213. Then, power is applied to the Ti target 25 from the RF power supply 27. For plasma discharge, a gas trigger is applied for several hundreds of milliseconds using the mass flow controller 213 so as to increase the pressure in the vacuum chamber 21 to several pascals. Thus the plasma discharge causes the Ti target 25 to release a deposition material, and the material is deposited on the surfaces of the die bases 11. The Ti film is nitrided into a TiN layer 13 by the $N_2$ gas introduced to the vacuum chamber 21. For this operation, it is more advantageous to perform pre-sputtering to remove the titanium oxide layer from surface of the Ti target in advance. This operation is performed by making a plasma discharge in a state where, for example, a shatter (not shown) disposed over the target is closed so that deposition is not made on the die bases 11. In addition, a bias voltage may be applied to the substrate holder 22 and the die bases 11 from the power supply 215 so that Ar and N ions produced by the plasma discharge are hit against the deposited film, thus increasing the density of the deposited film and the adhesion of the film with the die. The thickness of the TiN layer 13 can be controlled by varying the deposition time.

Then, the Ti sputtering target (not shown) is replaced with a Nb sputtering target 25 for three-target sputtering of Nb, Ir and Ni. The releasing layer 14 is formed over the die bases 11 provided with the TiN layer 13 in the same apparatus by forming plasma with each RF power supply and the magnet at the rear side of the corresponding target. By controlling the proportion of the RF powers of the RF power supplies, the composition of the alloy film of the releasing layer 14 can be adjusted.

Method for Forming Optical Element

The molding die of the first embodiment is used in a method for forming an optical element. This method includes molding a glass preform into a shape by pressing.

Figure 5:
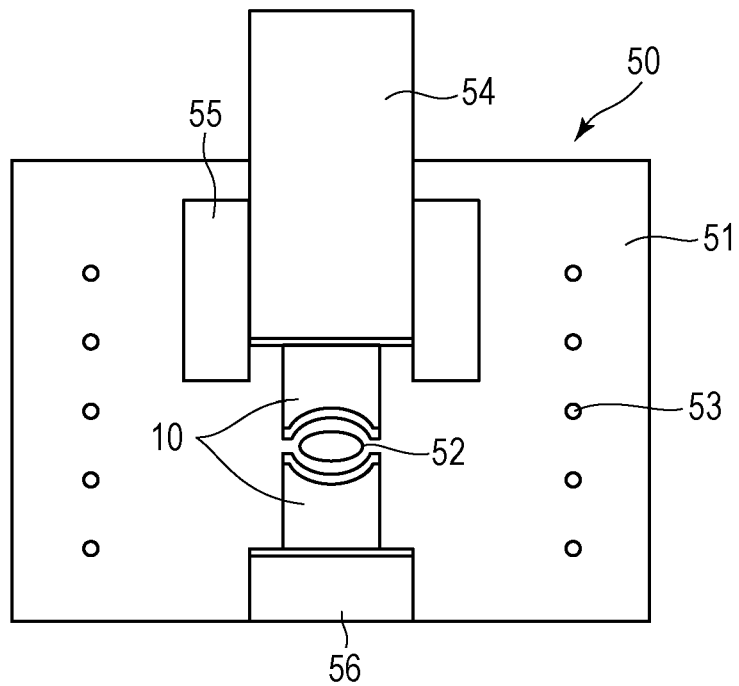
FIG. 5 is a schematic view of a molding apparatus used in a method for forming an optical element according to an embodiment of the present disclosure.

FIG. 5 is a schematic view of a molding apparatus used in the method according to the first embodiment for forming an optical element. This method will now be described with reference to FIG. 5. The molding apparatus 50 includes a chamber 51 and a set of molding dies 10 each having a releasing layer made of the amorphous alloy of the first embodiment of the present disclosure. A glass preform 52 is introduced between the molding dies 10. The molding apparatus 50 further includes a heater 53, a shaft 54 for pressing the upper die, a barrel 55 for positioning the shaft when pressing the upper die, and a support 56 supporting the lower die.

The interior of the chamber 51 is purged with nitrogen, and then the glass preform 52, the molding dies 10 and the barrel 55 are heated to a predetermined temperature by the heater 53. Then, the glass preform 52 is subjected to press molding between the upper and the lower molding die 10, using the shaft 54 and the support 56.

Since the upper die slides on the barrel 55 during molding, super-hard powder is produced from the sliding portion by repeating the molding operation. If glass is subjected to molding with the super-hard powder on the releasing layer 14, the releasing layer 14 is strongly rubbed with the super-hard powder present between the glass and the releasing layer 14 by expansion and contraction of the glass caused by temperature changes. The releasing layers 14 of the molding dies 10 of the first embodiment are however harder than the super-hard powder and are accordingly unlikely to be scratched. Poor appearance of the resulting molded glass article, which results from transfer of scratches in the molding dies 10, is therefore prevented.

In the present embodiment, the surface of the molding die 10 that will come in contact with glass has the releasing layer made of a chemically stable amorphous alloy that does not contain grain boundaries and forms a stable passivation film at the surface thereof. Glass is therefore unlikely to be fused to the die. The thickness of the releasing layer is desirably in the range of 20 nm to 1000 nm. If the thickness is excessively small, the deposited material of the releasing layer can lie in an island manner without forming a layer, and there may be produced a region where the amorphous alloy of the first embodiment is not deposited. If the amorphous alloy is deposited to a thickness of 20 nm or more, a continuous layer of the deposited material can be formed by sputtering.

In contrast, the releasing layer having a thickness of more than 1000 nm is likely to have such a high film stress as can cause separation. By taking measure to control the film stress by adjusting the deposition conditions or to prevent separation by forming an adhesion layer, a film with a large thickness of more than 1000 nm can be deposited. Such a large thickness is however not required for molding. Accordingly, in the case of deposition to a thickness of 1000 nm or less, measures are not required for controlling stress by adjusting deposition conditions or for preventing separation by forming an adhesion layer.

In addition, the surface of the glass preform may be coated with diamond-like carbon (DLC) so as to be released easily. In this instance, the molded article can be released at a high temperature. Accordingly, takt time can be reduced to increase productivity. Since the DLC film coating the glass preform has a hardness of 13 GPa or less, the amorphous alloy releasing layer of the first embodiment over the surface of the die is unlikely to be scratched when it is brought into contact with the DLC film coating the glass preform.

Optical elements that can be formed by the method of the present embodiment include, for example, lenses, prisms and diffraction gratings.

EXAMPLES

Examples of the amorphous alloy according to the first embodiment, deposited using a sputtering apparatus will now be described. The amorphous alloy of the first embodiment is not limited to that deposited by the above-described process.

For the Examples, evaluation was performed according to the following procedure.

Composition

The composition was analyzed with an X-ray photoelectron spectrometer (XPS) PHI Quantera SXM (manufactured by ULVAC-PHI). Survey scan was performed, and then narrow scan was performed for detected elements by the survey scan. For the depth profile, the operation of sputtering at 4 kV for 1 minute was performed three times for each measurement. The composition that no longer fluctuated was defined as the composition of the alloy. Hardness The hardness was measured with a nano-indenter manufactured by Agilent Technologies. Each sample was measured at 10 points at intervals of 50 µm while being shifted in a lateral direction. All the measurements except abnormal values affected by dust or any other foreign matter were averaged.

Crystallinity

For crystallinity, the presence of crystalline peaks was checked by a θ-2θ method of Philips X'pert.

The crystallinity of the alloy was measured after heating at 650° C. for 110 hours with a SiC heater in a chamber evacuated to $1 \times 10^{-3}$ Pa.

Corrosion Resistance

For corrosion resistance, the sample was immersed in a diluted solution of buffered hydrofluoric acid for 2 hours. The weight of the sample was measured before and after the immersion. The diluted buffered hydrofluoric acid solution was prepared by diluting to 5% a buffered hydrofluoric acid that is the mixture of 40% ammonium fluoride aqueous solution and 47% hydrofluoric acid aqueous solution in a weight ratio of 1:6. Samples whose weight did not vary were determined to be resistant to corrosion (rated as A); and samples whose weight decreased slightly were determined to be not resistant to corrosion (rated as B).

Example 1-1

Examples of the amorphous alloy film and the molding die using the amorphous alloy film, according to the first embodiment will now be described.

The amorphous alloy film of Example 1-1 was formed using a Nb sintered target of 76.2 mm (3 inches) in diameter with a purity of 99.9% for Nb, an Ir molten target of 76.2 mm (3 inches) in diameter with a purity of 99.9% for Ir, and a Ni sintered target of 76.2 mm (3 inches) in diameter with a purity of 99.9% for Ir. An alloy film was deposited using these targets and the sputtering apparatus described in the above-described embodiment. The deposition was performed under the conditions: an ultimate pressure of $5 \times 10^{-5}$ Pa before deposition, a chamber pressure of 0.5 Pa during deposition, a DC bias to the substrate holder of −100 V, and a deposition rate of 0.2 nm/s.

In Example 1-1, for the upper die, a Ti layer and a TiN layer were deposited to a total thickness of 1 µm on a cemented carbide J05 die (manufactured by Fuji Die) cut and polished into a convex shape having an outer diameter of 18 mm and a curvature radium of 22 mm under predetermined conditions. Over the Ti and the TiN layer, a releasing layer of an amorphous alloy containing 48.0 atomic % of Nb, 42.0 atomic % of Ir, and 9.0 atomic % of Ni was deposited to a thickness of 150 nm. For the lower die, a Ti layer and a TiN layer were deposited to a total thickness of 1 µm on a cemented carbide J05 die cut and polished into a concave shape having an outer diameter of 18 mm and a curvature radium of 22 mm. Over the Ti and the TiN layer, a releasing layer of an amorphous alloy containing 48.0 atomic % of Nb, 42.0 atomic % of Ir, and 9.0 atomic % of Ni was deposited to a thickness of 150 nm.

The resulting amorphous alloy film had a hardness of 12.9 GPa. The result of X-ray diffraction analysis showed that the film was amorphous.

A glass preform of an optical glass L-BAL 42 manufactured by Ohara was subjected to molding using the resulting dies. The glass preform was introduced between the dies at a temperature of 530° C., and pressed at 620° C. for 1 minute. Then, the temperature of the molding dies was reduced, and the molded glass was released from the dies at 550° C. After the completion of molding, the molding dies were observed. There were no defects, such as scratches or abrasion or fused glass, at the surfaces thereof. Also, there was no poor appearance, such as flaws, in the molded glass.

The crystallinity of the alloy films was measured after heating at 650° C. for 110 hours in a chamber evacuated to $1\times10^{-3}$ Pa. The alloy films were amorphous.

The use of the molding dies of the first embodiment enables molding without damaging the dies or molded product even under conditions where dust is produced from a sliding portion, consequently providing a molded article without poor appearance.

Example 1-2

Example 1-2 used the same targets as Example 1-1. An alloy film was formed using the targets in the same manner as in Example 1-1. The deposition was performed under the conditions: an ultimate pressure of $5\times10^{-5}$ Pa before deposition, a chamber pressure of 0.5 Pa during deposition, a DC bias to the substrate holder of −100 V, and a deposition rate of 0.2 nm/s.

In Example 1-2, for the upper die, a Ti layer and a TiN layer were deposited to a total thickness of 1.2 μm on a cemented carbide C95 die (manufactured by Fuji Die) cut and polished into a convex shape having an outer diameter of 18 mm and a curvature radium of 22 mm. Over the Ti and the TiN layer, a releasing layer of an amorphous alloy containing 41.0 atomic % of Nb, 45.0 atomic % of Ir, and 14.0 atomic % of Ni was deposited to a thickness of 150 nm. For the lower die, a Ti layer and a TiN layer were deposited to a total thickness of 1 μm on a cemented carbide C95 die (manufactured by Fuji Die) cut and polished into a concave shape having an outer diameter of 18 mm and a curvature radium of 22 mm. Over the Ti and the TiN layer, a releasing layer of an amorphous alloy containing 41.0 atomic % of Nb, 45.0 atomic % of Ir, and 14.0 atomic % of Ni was deposited to a thickness of 170 nm.

The resulting amorphous alloy film had a hardness of 12.5 GPa. The result of X-ray diffraction analysis showed that the film was amorphous.

The crystallinity and hardness of the alloy of the releasing layers were measured after heating the dies at 650° C. for 110 hours. The alloy was amorphous and had a hardness of 13.5 GPa.

A glass preform containing fluorine was subjected to molding at 600° C. using the dies prepared above. The glass contained 57.0 mol % of $SiO_2$, 16.2 mol % of $B_2O_3$, 0.2 mol % of $Al_2O_3$, 12.3 mol % of $K_2O$, 14.3 mol % of $F_2$, and whose surface was coated with a 20 nm thick diamond-like carbon (DLC) film before molding. After the molding, there were no defects, such as scratches or abrasion or fused glass, at the surfaces of the dies. Also, there were no flaws considered to be poor appearance in the molded glass.

The use of the molding dies of the first embodiment enables molding of glass that contains reactive fluorine and is accordingly considered to be unsuitable for molding.

Examples 1-3 to 1-20

In Examples 1-3 to 1-20, molding dies having amorphous alloy films were prepared in the same manner as in Example 1-1, except that the amorphous alloy films had the compositions shown in Table 1.

Comparative Examples 1-1 to 1-7

In Comparative Examples 1-1 to 1-7, molding dies having amorphous alloy films were prepared in the same manner as in Example 1-1, except that the amorphous alloy films had the compositions shown in Table 1.

Evaluation

In Examples 1-1 to 1-20, each of the resulting films contained 35.6 atomic % to 75.1 atomic % of Nb, 7.2 atomic % to 52.3 atomic % of Ir, and 4.0 atomic % to 48.5 atomic % of Ni, as shown in Table 1. Before being heated, the alloy films of Examples 1-1 to 1-20 were amorphous and had a hardness of 12.5 GPa or more.

The amorphous alloy films of Examples 1-3 to 1-10 each contained 37.4 atomic % to 72.4 atomic % of Nb, 18.0 atomic % to 52.3 atomic % of Ir, and 4.0 atomic % to 25.6 atomic % of Ni, as shown in Table 1. Even after being heated at 650° C., the amorphous alloy films of Examples 1-2 to 1-10 were amorphous and exhibited high heat resistance and high corrosion resistance.

In Comparative Examples 1-1 to 1-7, some of the alloy films were crystallized, and the other were amorphous, but exhibited a low hardness, as shown in Table 1.

It was shown that the amorphous alloys of Examples 1-1 to 1-20 can form a releasing layer having a hardness in the range of 12.5 GPa to 23.4 GPa for a molding die.

TABLE 1

| | Composition (atomic %) | | | Crystallinity | | Hardness (GPa) | | Corrosion resistance |
|---|---|---|---|---|---|---|---|---|
| | Nb | Ir | Ni | Before heating | After heating | Before heating | After heating | |
| Example 1-1 | 48.0 | 42.0 | 9.0 | Amorphous | Amorphous | 12.9 | — | — |
| Example 1-2 | 41.0 | 45.0 | 14.0 | Amorphous | Amorphous | 12.5 | 13.5 | — |
| Example 1-3 | 48.1 | 26.3 | 25.6 | Amorphous | Amorphous | 13.2 | 13.5 | A |
| Example 1-4 | 56.4 | 21.5 | 22.1 | Amorphous | Amorphous | 13.6 | 19.2 | A |
| Example 1-5 | 64.4 | 18.0 | 17.6 | Amorphous | Amorphous | 13.5 | 19.0 | A |
| Example 1-6 | 37.4 | 52.3 | 10.3 | Amorphous | Amorphous | 14.7 | 23.4 | A |
| Example 1-7 | 48.9 | 39.4 | 11.7 | Amorphous | Amorphous | 13.2 | 17.1 | A |
| Example 1-8 | 72.4 | 23.6 | 4.0 | Amorphous | Amorphous | 12.9 | 18.4 | A |
| Example 1-9 | 63.7 | 31.5 | 4.8 | Amorphous | Amorphous | 13.8 | 18.2 | A |
| Example 1-10 | 61.8 | 25.2 | 12.9 | Amorphous | Amorphous | 13.5 | 17.6 | A |
| Example 1-11 | 64.1 | 15.8 | 12.9 | Amorphous | Crystalline | 13.6 | — | B |
| Example 1-12 | 35.2 | 35.1 | 29.7 | Amorphous | Crystalline | 12.7 | — | B |
| Example 1-13 | 69.9 | 15.6 | 14.5 | Amorphous | Crystalline | 13.9 | — | B |
| Example 1-14 | 35.6 | 15.9 | 48.5 | Amorphous | Crystalline | 12.6 | — | B |
| Example 1-15 | 44.0 | 24.5 | 31.5 | Amorphous | Crystalline | 12.6 | — | B |
| Example 1-16 | 34.5 | 24.0 | 41.5 | Amorphous | Crystalline | 12.6 | — | B |
| Example 1-17 | 75.1 | 13.2 | 11.6 | Amorphous | Crystalline | 13.4 | — | B |
| Example 1-18 | 53.6 | 9.9 | 36.5 | Amorphous | Crystalline | 13.6 | — | B |

TABLE 1-continued

| | Composition (atomic %) | | | Crystallinity | | Hardness (GPa) | | Corrosion resistance |
|---|---|---|---|---|---|---|---|---|
| | Nb | Ir | Ni | Before heating | After heating | Before heating | After heating | |
| Example 1-19 | 65.5 | 7.2 | 27.3 | Amorphous | Crystalline | 12.9 | — | B |
| Example 1-20 | 71.4 | 8.2 | 20.3 | Amorphous | Crystalline | 14.8 | — | B |
| Comparative Example 1-1 | 26.9 | 12.7 | 60.5 | Amorphous | — | 10.9 | — | — |
| Comparative Example 1-2 | 24.0 | 5.2 | 70.8 | Amorphous | — | 11.4 | — | — |
| Comparative Example 1-3 | 38.2 | 6.7 | 55.1 | Amorphous | — | 11.2 | — | — |
| Comparative Example 1-4 | 89.6 | 8.1 | 2.3 | Crystalline | — | 13.3 | — | B |
| Comparative Example 1-5 | 15.2 | 5.3 | 79.5 | Crystalline | — | 12.2 | — | B |
| Comparative Example 1-6 | 16.4 | 57.5 | 26.8 | Crystalline | — | — | — | B |
| Comparative Example 1-7 | 18.4 | 51.0 | 32.6 | Crystalline | — | — | — | B |

The amorphous alloy of the first embodiment and a molding die using the amorphous alloy are chemically stable and releasable and have such a hardness that they cannot be scratched during molding operation. Accordingly, the molding die can be used for forming optical elements, such as lenses and prisms.

The first embodiment of the disclosure provides a chemically stable, corrosion-resistant, hard amorphous alloy, and a molding die that is not easily damaged or scratched during molding. The first embodiment also provides a method for forming an optical element using the molding die, which is not easily damaged during molding.

Second Embodiment

A second embodiment relates to an amorphous alloy, a molding die used for forming optical elements, such as lenses and prisms, by press molding of glass material, and a method for forming an optical element.

The second embodiment will now be described in detail.

Amorphous Alloy

The amorphous alloy of the second embodiment contains Nb, Re and Ni. More specifically, the amorphous alloy of the second embodiment contains Nb with a content in the range of 19.6 atomic % to 80.9 atomic %, Re with a content in the range of 7.4 atomic % to 59.2 atomic %, and Ni with a content in the range of 4.1 atomic % to 56.9 atomic %. Such a composition can form a Nb—Re—Ni amorphous alloy film having a hardness higher than or equal to the hardness of cemented carbide.

Desirably, the amorphous alloy of the second embodiment contains Nb with a content in the range of 47.2 atomic % to 70.0 atomic %, Re with a content in the range of 17.5 atomic % to 39.7 atomic %, and Ni with a content in the range of 5.8 atomic % to 29.4 atomic %. The amorphous alloy film having such a composition can have a hardness higher than or equal to the hardness of cemented carbide of 13 GPa or more and a heat resistance sufficient to maintain the amorphous structure even if the film is heated at a temperature of 600° C. or more.

The amorphous alloy of the second embodiment is highly resistant to corrosion and heat and has a high hardness.

In the second embodiment, the amorphous alloy is present in the form of a Nb—Ni alloy that is likely to be amorphous, and in addition, further contains Re. Re is hard and resistant to heat and corrosive elements, such as fluorine. Also, Re helps the amorphization of the alloy because of the negative enthalpy of mixing with Nb. The amorphous alloy of the second embodiment has a high hardness and is highly resistant to heat and corrosion.

Advantageously, the sum of the contents of Nb, Re and Ni in the amorphous alloy is in the range of 97.0 atomic % to 100 atomic %, preferably in the range of 99.0 atomic % to 100 atomic %, and more preferably in the range of 99.8 atomic % to 100 atomic %. The amorphous alloy of the second embodiment may contain inevitable impurities, such as Fe, other than oxygen. The content of inevitable impurities other than oxygen is desirably 0.03 atomic % or less relative to the total content of the amorphous alloy.

Molding Die

The molding die of the second embodiment is the same as that of the first embodiment, except for the releasing layer, which is made of the amorphous alloy of the present embodiment.

Since the molding die of the second embodiment has a releasing layer made of a chemically stable amorphous alloy, the die is chemically stable and highly releasable. Accordingly, the molding die is unlikely to be damaged or scratched when used for molding.

The releasing layer of the molding die of the second embodiment is made of the amorphous alloy having the above-described composition, and the amorphous alloy has a hardness higher than or equal to that of cemented carbide.

The releasing layer of the molding die of the second embodiment may contain other elements than Nb, Re and Ni. Such elements may derive from inevitable impurities from a trace of impurities contained in the targets and particles or residual gas in the deposition chamber. If the amorphous alloy film is formed by vacuum deposition, oxygen may be trapped in the film during deposition by residual gas, such as moisture, in the vacuum chamber. Although the amorphous alloy film is ideally free from oxygen, 0.1 atomic % to several atomic percent of oxygen may be trapped in the amorphous alloy even though the chamber is evacuated for a long time or gas adsorbed to the inner walls of the chamber is reduced by baking. The releasing layer of the amorphous alloy of the second embodiment is amorphous (non-crystalline) as required and has a desired hardness even if it contains such inevitable oxygen.

Method for Forming Optical Element

The molding die of the second embodiment is used in a method for forming an optical element. This method includes molding a glass preform into a shape by pressing.

The method of the second embodiment is the same as in the first embodiment except for the releasing layer made of a different amorphous alloy.

EXAMPLES

Examples of amorphous alloy films formed in the sputtering apparatus and deposition process described in the present embodiment will now be described. The amorphous alloy film of the present embodiment is not limited to that formed by the above-described deposition process. For the Examples, evaluation was performed according to the following procedure.

Composition

The composition was analyzed with an X-ray photoelectron spectrometer (XPS) PHI Quantera SXM (manufactured by ULVAC-PHI). Survey scan was performed, and then narrow scan was performed for detected elements by the survey scan. For the depth profile, the operation of sputtering at 4 kV for 1 minute was performed three times for each measurement. The composition that no longer fluctuated was defined as the composition of the alloy.

Hardness

The hardness was measured with a nano-indenter manufactured by Agilent Technologies. Each sample was measured at 10 points at intervals of 50 μm while being shifted in a lateral direction. All the measurements except abnormal values affected by dust or any other foreign matter were averaged.

Crystallinity

For crystallinity, the presence of crystalline peaks was checked by a θ–2θ method of Philips X'pert.

The crystallinity of the alloy was measured after heating at 500° C. for 100 hours in a chamber evacuated to $1 \times 10^{-3}$ Pa.

Example 2-1

Examples of the Nb—Re—Ni amorphous alloy film and the molding die using the amorphous alloy film, according to the second embodiment will now be described.

The amorphous alloy film of Example 2-1 was formed using a Nb sintered target of 76.2 mm (3 inches) in diameter with a purity of 99.9% for Nb, a Re molten target of 76.2 mm (3 inches) in diameter with a purity of 99.9% for Ir, and a Ni sintered target of 76.2 mm (3 inches) in diameter with a purity of 99.9% for Ir. An alloy film was deposited using these targets and the sputtering apparatus described in the above-described embodiment. The deposition was performed under the conditions: an ultimate pressure of $5 \times 10^{-5}$ Pa before deposition, a chamber pressure of 0.5 Pa during deposition, a DC bias to the substrate holder of –100 V, and a deposition rate of 0.2 nm/s.

In Example 2-1, for the upper die, a Ti layer and a TiN layer were deposited to a total thickness of 1 μm on a cemented carbide J05 die (manufactured by Fuji Die) cut and polished into a convex shape having an outer diameter of 18 mm and a curvature radium of 22 mm under predetermined conditions. Over the Ti and the TiN layer, a releasing layer of an amorphous alloy containing 60.1 atomic % of Nb, 25.2 atomic % of Re, and 14.8 atomic % of Ni was deposited to a thickness of 150 nm.

For the lower die, a Ti layer and a TiN layer were deposited to a total thickness of 1 μm on a cemented carbide J05 die cut and polished into a concave shape having an outer diameter of 18 mm and a curvature radium of 22 mm. Over the Ti and the TiN layer, a releasing layer of an amorphous alloy containing 60.1 atomic % of Nb, 25.2 atomic % of Re, and 14.8 atomic % of Ni was deposited to a thickness of 150 nm.

The resulting amorphous alloy film had a hardness of 17.5 GPa. The result of X-ray diffraction analysis showed that the film was amorphous. Furthermore, the dies were heated at 600° C. for 100 hours with a SiC heater in a chamber evacuated to $1 \times 10^{-3}$ Pa. It was shown that the alloy films maintained the amorphous structure thereof even after being heated.

A glass preform of an optical glass L-BAL 42 manufactured by Ohara was subjected to molding using the resulting dies. The glass preform was pressed at 620° C. for 3 minute. After the completion of molding, the dies were observed. There were no defects, such as scratches or abrasion or fused glass, at the surfaces thereof. Also, there was no poor appearance, such as flaws, in the molded glass.

The dies were heated at 600° C. for 100 hours with a SiC heater in a chamber evacuated to $1 \times 10^{-3}$ Pa. It was shown that the alloy films had an amorphous structure. The use of the molding dies of the second embodiment enables molding without damaging the dies or molded product even under conditions where dust is produced from a sliding portion, consequently providing a molded product without poor appearance.

Example 2-2

Example 2-2 used the same targets as Example 2-1. An amorphous alloy film was deposited using these targets in the same sputtering apparatus in the same deposition process as in Example 2-1. The deposition was performed under the conditions: an ultimate pressure of $5 \times 10^{-5}$ Pa before deposition, a chamber pressure of 0.5 Pa during deposition, a DC bias to the substrate holder of –100 V, and a deposition rate of 0.2 nm/s.

In Example 2-2, for the upper die, a Ti layer and a TiN layer were deposited to a total thickness of 1.2 μm on a cemented carbide J05 die (manufactured by Fuji Die) cut and polished into a convex shape having an outer diameter of 18 mm and a curvature radium of 22 mm. Over the Ti and the TiN layer, a releasing layer of an amorphous alloy containing 52.9 atomic % of Nb, 23.1 atomic % of Re, and 24.0 atomic % of Ni was deposited to a thickness of 200 nm.

For the lower die, a Ti layer and a TiN layer were deposited to a total thickness of 1 μm on a cemented carbide J05 die cut and polished into a concave shape having an outer diameter of 18 mm and a curvature radium of 22 mm. Over the Ti and the TiN layer, a releasing layer of an amorphous alloy containing 52.9 atomic % of Nb, 23.1 atomic % of Re, and 24.0 atomic % of Ni was deposited to a thickness of 200 nm.

The resulting amorphous alloy film had a hardness of 16.2 GPa. The result of X-ray diffraction analysis showed that the film was amorphous. Furthermore, the dies were heated at 600° C. for 100 hours with a SiC heater in a chamber evacuated to $1 \times 10^{-3}$ Pa. It was shown that the alloy films had an amorphous structure.

A glass preform containing 65.27 mol % of $SiO_2$, 16.41 mol % of $F_2$, 14.07 mol % of $K_2O$, 3.99 mol % of $Ba_2O_3$, 0.20 mol % of $Al_2O_3$, and 0.05 mol % of $Sb_2O_3$ (analyzed by plasma emission spectrometry; F was measured with an ion meter after being evaporated) was subjected to molding using the resulting dies. The glass preform was pressed at 600° C. for 3 minute.

The glass preform was coated with a 20 nm thick DLC film over the surface thereof before being subjected to molding. After the molding, there were no defects, such as scratches or abrasion or fused glass, at the surfaces of the dies. Also, there were no flaws considered to be poor appearance in the molded glass. In Example 2-2, a glass preform containing a large amount of fluorine was able to be molded into a shape. This suggests that the releasing layer having the composition of Example 2-2 is resistant to corrosion.

Example 2-3

Example 2-3 used the same targets as Example 2-1. An alloy film was deposited using these targets in the deposition process described in the above-described embodiment.

In Example 2-3, for the upper die, a Ti layer and a TiN layer were deposited to a total thickness of 1.2 μm on a cemented carbide J05 die (manufactured by Fuji Die) cut and polished into a convex shape having an outer diameter of 18 mm and a curvature radium of 22 mm. Over the Ti and the TiN layer, a releasing layer of an amorphous alloy containing 65.4 atomic % of Nb, 17.5 atomic % of Re, and 17.1 atomic % of Ni was deposited to a thickness of 200 nm.

For the lower die, a Ti layer and a TiN layer were deposited to a total thickness of 1 μm on a cemented carbide J05 die cut and polished into a concave shape having an outer diameter of 18 mm and a curvature radium of 22 mm. Over the Ti and the TiN layer, a releasing layer of an amorphous alloy containing 65.4 atomic % of Nb, 17.5 atomic % of Re, and 17.1 atomic % of Ni was deposited to a thickness of 200 nm.

The resulting Nb—Re—Ni amorphous alloy film had a hardness of 16.3 GPa. The result of X-ray diffraction analysis showed that the film was amorphous. Furthermore, the dies were heated at 600° C. for 100 hours with a SiC heater in a chamber evacuated to $1 \times 10^{-3}$ Pa. It was shown that the alloy films had an amorphous structure.

A glass preform containing 60.96 mol % of F, 9.69 mol % of CaO, 9.41 mol % of SrO, 6.31 mol % of $P_2O_5$, 5.47 mol % of $Al_2O_3$, 4.24 mol % of BaO, 3.87 mol % of MgO, 0.03 mol % of $SO_3$, and 0.02 mol % of $Na_2O$ (analyzed by plasma emission spectrometry; F was measured with an ion meter after being evaporated) was subjected to molding. The glass preform was pressed at 510° C. for 3 minute.

After the molding, there were no defects, such as scratches or abrasion or fused glass, at the surfaces of the dies. Also, there were no flaws considered to be poor appearance in the molded glass. In Example 2-3, a glass preform containing a large amount of fluorine was able to be molded into a shape. This suggests that the releasing layer having the composition of Example 2-3 is resistant to corrosion.

Examples 2-4 to 2-37

In Examples 2-4 to 2-37, molding dies having amorphous alloy films were prepared in the same manner as in Example 2-1, except that the amorphous alloy films had the compositions shown in Table 2.

More specifically, the amorphous alloys of Examples 2-4 to 2-37 contained Nb with a content in the range of 19.6 atomic % to 80.9 atomic %, Re with a content in the range of 7.4 atomic % to 59.2 atomic %, and Ni with a content in the range of 4.1 atomic % to 56.9 atomic %. These amorphous alloys of Examples 2-4 to 2-37 exhibited hardnesses of 13 GPa or more, as in Examples 2-1 to 2-3.

Comparative Examples 2-1 to 2-5

In Comparative Examples 2-1 to 2-5, molding dies having Nb—Re—Ni alloy films were prepared in the same manner as in Example 2-1, except that the alloy films had the compositions shown in Table 2.
Evaluation In Examples 2-1 to 2-37, each of the amorphous alloy films contained 19.6 atomic % to 80.9 atomic % of Nb, 7.4 atomic % to 59.2 atomic % of Re, and 4.1 atomic % to 56.9 atomic % of Ni, as shown in Table 2. Each of the compositions of Examples 2-1 to 2-37 can form a Nb—Re—Ni amorphous alloy film having a hardness higher than or equal to the hardness of cemented carbide of 13 GPa.

The amorphous alloy films of Examples 2-1 to 2-13 each contained 47.2 atomic % to 70.0 atomic % of Nb, 17.5 atomic % to 39.7 atomic % of Re, and 5.8 atomic % to 29.4 atomic % of Ni, as shown in Table 2. These amorphous alloy films having such a composition exhibited a hardness higher than or equal to the hardness of cemented carbide of 13 GPa or more and a heat resistance sufficient to maintain the amorphous structure even if the film is heated at a temperature of 600° C. or more.

In Comparative Examples 2-1 to 2-6, the alloy films were crystallized or amorphous, and the hardness thereof was as low as less than 13 GPa, as shown in Table 2.

It was shown that the amorphous alloys of Examples 2-1 to 2-37 can form a releasing layer having a hardness in the range of 13.7 GPa to 17.9 GPa for a molding die.

TABLE 2

| | Composition (atomic %) | | | Crystallinity | | Hardness (GPa) |
|---|---|---|---|---|---|---|
| | Nb | Re | Ni | After deposition | After heating | |
| Example 2-1 | 60.1 | 25.2 | 14.8 | Amorphous | Amorphous | 17.5 |
| Example 2-2 | 52.9 | 23.1 | 24.0 | Amorphous | Amorphous | 16.2 |
| Example 2-3 | 65.4 | 17.5 | 17.1 | Amorphous | Amorphous | 16.3 |
| Example 2-4 | 59.9 | 28.2 | 11.8 | Amorphous | Amorphous | 17.5 |
| Example 2-5 | 48.3 | 33.2 | 18.5 | Amorphous | Amorphous | 17.9 |
| Example 2-6 | 69.0 | 25.2 | 5.8 | Amorphous | Amorphous | 16.4 |
| Example 2-7 | 47.3 | 23.3 | 29.4 | Amorphous | Amorphous | 17.0 |
| Example 2-8 | 47.2 | 39.7 | 13.1 | Amorphous | Amorphous | 14.5 |
| Example 2-9 | 70.0 | 24.0 | 6.0 | Amorphous | Amorphous | 16.4 |
| Example 2-10 | 51.1 | 22.0 | 26.9 | Amorphous | Amorphous | 16.2 |
| Example 2-11 | 47.2 | 39.7 | 13.1 | Amorphous | Amorphous | 17.9 |
| Example 2-12 | 52.5 | 30.4 | 17.1 | Amorphous | Amorphous | 17.5 |
| Example 2-13 | 58.6 | 23.7 | 17.7 | Amorphous | Amorphous | 17.5 |
| Example 2-14 | 78.7 | 17.2 | 4.1 | Amorphous | — | 16.4 |
| Example 2-15 | 80.9 | 10.8 | 8.3 | Amorphous | — | 16.4 |
| Example 2-16 | 49.6 | 12.2 | 38.2 | Amorphous | — | 14.7 |
| Example 2-17 | 37.0 | 12.8 | 50.2 | Amorphous | — | 14.5 |
| Example 2-18 | 35.7 | 7.4 | 56.9 | Amorphous | — | 13.7 |
| Example 2-19 | 19.6 | 41.9 | 38.5 | Amorphous | — | 15.0 |
| Example 2-20 | 20.9 | 59.2 | 19.9 | Amorphous | — | 15.6 |
| Example 2-21 | 41.0 | 42.1 | 16.9 | Amorphous | — | 14.7 |
| Example 2-22 | 31.1 | 17.9 | 51.0 | Amorphous | — | 14.5 |
| Example 2-23 | 23.1 | 34.4 | 42.5 | Amorphous | — | 15.1 |
| Example 2-24 | 25.9 | 36.1 | 38.0 | Amorphous | — | 15.7 |
| Example 2-25 | 22.0 | 41.1 | 36.9 | Amorphous | — | 15.0 |
| Example 2-26 | 36.8 | 33.0 | 30.3 | Amorphous | — | 15.7 |
| Example 2-27 | 41.9 | 29.6 | 28.5 | Amorphous | — | 17.0 |
| Example 2-28 | 31.7 | 23.3 | 45.0 | Amorphous | — | 14.9 |
| Example 2-29 | 46.1 | 23.2 | 30.7 | Amorphous | — | 15.3 |
| Example 2-30 | 37.9 | 24.8 | 37.4 | Amorphous | — | 15.2 |
| Example 2-31 | 44.7 | 15.8 | 39.4 | Amorphous | — | 14.7 |

TABLE 2-continued

| | Composition (atomic %) | | | Crystallinity | | Hardness (GPa) |
|---|---|---|---|---|---|---|
| | Nb | Re | Ni | After deposition | After heating | |
| Example 2-32 | 38.4 | 14.0 | 47.6 | Amorphous | — | 14.5 |
| Example 2-33 | 72.6 | 15.8 | 11.6 | Amorphous | — | 16.4 |
| Example 2-34 | 35.7 | 7.4 | 56.9 | Amorphous | — | 13.7 |
| Example 2-35 | 42.9 | 9.4 | 47.7 | Amorphous | — | 13.9 |
| Example 2-36 | 61.2 | 15.2 | 23.6 | Amorphous | — | 15.6 |
| Example 2-37 | 54.6 | 13.8 | 31.7 | Amorphous | — | 15.9 |
| Comparative Example 2-1 | 31.3 | 4.1 | 64.6 | Amorphous | — | 12.8 |
| Comparative Example 2-2 | 84.8 | 8.7 | 6.5 | Crystalline | — | — |
| Comparative Example 2-3 | 14.4 | 2.0 | 83.6 | Crystalline | — | — |
| Comparative Example 2-4 | 11.6 | 68.1 | 20.3 | Crystalline | — | — |
| Comparative Example 2-5 | 7.9 | 82.2 | 9.9 | Crystalline | — | — |

The Nb—Re—Ni amorphous alloy of the second embodiment and a molding die using the amorphous alloy are chemically stable and releasable, and have such a hardness that they cannot be scratched during molding operation. Accordingly, the molding die can be used for forming optical elements, such as lenses and prisms.

The second embodiment of the disclosure provides a chemically stable, hard amorphous alloy, and a molding die that is not easily damaged or scratched during molding. The second embodiment also provides a method for forming an optical element using the molding die, which is not easily damaged during molding.

Third Embodiment

A third embodiment relates to an amorphous alloy, a molding die used for forming optical elements, such as lenses and prisms, by press molding of glass material, and a method for forming an optical element.

The third embodiment will now be described in detail.

Amorphous Alloy

The amorphous alloy of the third embodiment is a chemically stable, hard Nb—W—Ni amorphous alloy.

The amorphous alloy of the third embodiment contains Nb, W and Ni. More specifically, the amorphous alloy of the third embodiment contains Nb with a content in the range of 7.5 atomic % to 52.9 atomic %, W with a content in the range of 16.4 atomic % to 47.0 atomic %, and Ni with a content in the range of 22.0 atomic % to 53.3 atomic %. Desirably, the amorphous alloy contains Nb with a content in the range of 7.5 atomic % to 52.9 atomic %, W with a content in the range of 16.4 atomic % to 47.0 atomic %, and Ni with a content in the range of 22.0 atomic % to 29.0 atomic %.

More desirably, the amorphous alloy contains Nb with a content in the range of 35.0 atomic % to 41.7 atomic %, W with a content in the range of 35.4 atomic % to 40.4 atomic %, and Ni with a content in the range of 22.0 atomic % to 25.0 atomic %. The amorphous alloy having such a composition has not only a high hardness and corrosion resistance, but also a high heat resistance. The unit "atomic %" used herein represents atomic composition in percentage.

The amorphous alloy of the third embodiment, which is a Nb—Ni-based alloy containing W, has a high hardness and is chemically stable and resistant to heat.

Advantageously, the sum of the contents of Nb, W and Ni in the amorphous alloy of the third embodiment is in the range of 97.0 atomic % to 100 atomic %, preferably in the range of 99.0 atomic % to 100 atomic %, and more preferably in the range of 99.8 atomic % to 100 atomic %. The amorphous alloy of the third embodiment may contain inevitable impurities, such as Fe. The content of inevitable impurities other than oxygen in the amorphous alloy is desirably 0.2 atomic % or less, and more desirably 0.03 atomic % or less.

Molding Die

The molding die of the third embodiment has at least one releasing layer made of the Nb—W—Ni amorphous alloy over the surface thereof. The molding die of the third embodiment is the same as that of the first embodiment except for the releasing layer.

The releasing layer of the molding die of the third embodiment, which is made of the amorphous alloy having the above-described composition, has a hardness higher than or equal to that of cemented carbide.

Since the molding die of the third embodiment has a releasing layer made of a chemically stable amorphous alloy, the die is chemically stable and highly releasable and has a high hardness. Accordingly, the molding die is unlikely to be damaged or scratched when used for molding.

Also, the releasing layer of the molding die of the third embodiment is made of a Nb—Ni alloy containing W. Such an alloy can form a desired alloy film at a lower cost than the case of other chemically stable, hard noble metals.

The releasing layer of the molding die of the third embodiment may contain other elements than Nb, W and Ni. Such elements may derive from inevitable impurities from a trace of impurities contained in the targets and particles and residual gas in the deposition chamber. If the amorphous alloy film is formed by vacuum deposition, oxygen may be trapped in the film during deposition by residual gas, such as moisture, in the vacuum chamber. Although the amorphous alloy film is ideally free from oxygen, 0.1 atomic % to several atomic percent of oxygen may be trapped in the amorphous alloy even though the chamber is evacuated for a long time or gas adsorbed to the inner walls of the chamber is reduced by baking. The releasing layer of the amorphous alloy of the present embodiment is amorphous (non-crystalline) having an amorphous structure (non-crystalline structure) as required and has a desired hardness even if it contains such inevitable oxygen.

Method for Forming Optical Element

The molding die of the third embodiment is used in a method for forming an optical element. This method includes molding a glass preform into a shape by pressing. The method of the third embodiment is the same as in the first embodiment except for the releasing layer made of a different amorphous alloy.

EXAMPLES

Examples of amorphous alloy films formed in the sputtering apparatus and deposition process described in the present embodiment will now be described. The amorphous alloy film of the present embodiment is not limited to that formed by the above-described deposition process. For the Examples, evaluation was performed according to the following procedure.

Composition

The composition was analyzed with PHI Quantera SXM (manufactured by ULVAC-PHI). Survey scan was performed, and then narrow scan was performed for detected elements by the survey scan. For the depth profile, the operation of sputtering at 4 kV for 1 minute was performed three times for each measurement. The composition that no longer fluctuated was defined as the composition of the alloy.

Hardness

The hardness was measured with a nano indenter manufactured by Agilent Technologies. Each sample was measured at 10 points at intervals of 50 μm while being shifted in a lateral direction. All the measurements except abnormal values affected by dust or any other foreign matter were averaged.

Crystallinity

For crystallinity, the presence of crystalline peaks was checked by a θ-2θ method of Philips X'pert.

The crystallinity of the alloy was measured after heating at 500° C. for 100 hours in a chamber evacuated to $1.5 \times 10^{-5}$ Pa.

Glass Composition

The composition of glass was analyzed by plasma emission spectrometry except for F. F was measured with an ion meter after being evaporated.

Example 3-1

Examples of the Nb—W—Ni amorphous alloy film and the molding die using the amorphous alloy film, according to the present embodiment will now be described.

The amorphous alloy film of Example 3-1 was formed using a Nb sintered target of 76.2 mm (3 inches) in diameter with a purity of 99.9% for Nb, a W molten target of 76.2 mm (3 inches) in diameter with a purity of 99.9% for W, and a Ni sintered target of 76.2 mm (3 inches) in diameter with a purity of 99.9% for Ir. An alloy film was deposited using these targets in the sputtering apparatus in the deposition process described in the above-described embodiment. The deposition was performed under the conditions: an ultimate pressure of $5 \times 10^{-5}$ Pa before deposition, a chamber pressure of 0.5 Pa during deposition, a DC bias to the substrate holder of −100 V, and a deposition rate of 0.2 nm/s.

In Example 3-1, for the upper die, a Ti layer and a TiN layer were deposited to a total thickness of 1.2 μm on a cemented carbide J05 die (manufactured by Fuji Die) cut and polished into a convex shape having an outer diameter of 18 mm and a curvature radium of 22 mm. Over the Ti and the TiN layer, a releasing layer of an amorphous alloy containing 39.3 atomic % of Nb, 37.9 atomic % of W, and 22.9 atomic % of Ni was deposited to a thickness of 170 nm.

For the lower die, a Ti layer and a TiN layer were deposited to a total thickness of 1.2 μm on a cemented carbide J05 die cut and polished into a concave shape having an outer diameter of 18 mm and a curvature radium of 22 mm. Over the Ti and the TiN layer, a releasing layer of an amorphous alloy containing 39.3 atomic % of Nb, 37.9 atomic % of W, and 22.9 atomic % of Ni was deposited to a thickness of 170 nm.

The resulting amorphous alloy film had a hardness of 14.9 GPa. The result of X-ray diffraction analysis showed that the film was amorphous. Furthermore, the dies were heated at 500° C. for 110 hours with a SiC heater in a chamber evacuated to $1.5 \times 10^{-5}$ Pa. The results of the measurement made as describe above show that the alloy films maintained the amorphous structure thereof even after being heated.

A glass preform of an optical glass L-BAL 42 manufactured by Ohara was subjected to molding using the resulting molding dies. The glass preform was pressed at 620° C. for 1 minute. After the completion of molding, the dies were observed. There were no defects, such as scratches or abrasion or fused glass, at the surfaces thereof. Also, there was no poor appearance, such as flaws, in the molded glass.

The use of the molding dies of the present embodiment enables molding without damaging the dies or molded product even under conditions where dust is produced from a sliding portion, consequently providing a molded product without poor appearance.

Example 3-2

Example 3-2 used the same targets as Example 3-1. An alloy film was deposited using these targets in the deposition process described in the above-described embodiment. An alloy film was formed using the targets in the same manner as in Example 3-1. The deposition was performed under the conditions: an ultimate pressure of $5 \times 10^{-5}$ Pa before deposition, a chamber pressure of 0.5 Pa during deposition, a DC bias to the substrate holder of −100 V, and a deposition rate of 0.2 nm/s.

In Example 3-2, for the upper die, a Ti layer and a TiN layer were deposited to a total thickness of 1 μm on a cemented carbide J05 die (manufactured by Fuji Die) cut and polished into a convex shape having an outer diameter of 18 mm and a curvature radium of 22 mm. Over the Ti and the TiN layer, a releasing layer of an amorphous alloy containing 37.9 atomic % of Nb, 37.0 atomic % of W, and 25.0 atomic % of Ni was deposited to a thickness of 150 nm.

For the lower die, a Ti layer and a TiN layer were deposited to a total thickness of 1 μm on a cemented carbide J05 die (manufactured by Fuji Die) cut and polished into a concave shape having an outer diameter of 18 mm and a curvature radium of 22 mm. Over the Ti and the TiN layer, a releasing layer of an amorphous alloy containing 37.9 atomic % of Nb, 37.0 atomic % of W, and 25.0 atomic % of Ni was deposited to a thickness of 150 nm.

The amorphous alloy films were subjected to X-ray diffraction analysis, and the results showed that the films were amorphous. The resulting amorphous alloy films had a hardness of 14.7 GPa. Furthermore, the dies were heated at 500° C. for 110 hours with a SiC heater in a chamber evacuated to $1.5 \times 10^{-5}$ Pa. The results of the measurement made as describe above show that the alloy films maintained the amorphous structure thereof even after being heated.

A glass preform containing 57.0 mol % of $SiO_2$, 16.2 mol % of $B_2O_3$, 0.2 mol % of $Al_2O_3$, 12.3 mol % of $K_2O$, and 14.3 mol % of $F_2$ was subjected to molding using the resulting dies. The glass preform was coated with a 20 nm thick DLC film over the surface thereof before being subjected to molding. The glass preform was then molded into a shape by pressing at 600° C. for 1 minute.

After the molding, there were no defects, such as scratches or abrasion or fused glass, at the surfaces of the dies. Also, there were no flaws considered to be poor appearance in the molded glass. In Example 3-2, a glass preform containing a large amount of fluorine was able to be molded into a shape. This suggests that the releasing layer having the composition of Example 3-2 is resistant to corrosion.

Example 3-3

Example 3-3 used the same targets as Example 3-1. An alloy film was deposited using these targets in the deposition process described in the above-described embodiment. An alloy film was formed using the targets in the same manner as in Example 3-1. The deposition was performed under the conditions: an ultimate pressure of $5 \times 10^{-5}$ Pa before deposition, a chamber pressure of 0.5 Pa during deposition, a DC bias to the substrate holder of −100 V, and a deposition rate of 0.2 nm/s.

In Example 3-3, for the upper die, a Ti layer and a TiN layer were deposited to a total thickness of 1.2 μm on a cemented carbide J05 die (manufactured by Fuji Die) cut and polished into a convex shape having an outer diameter of 18 mm and a curvature radium of 22 mm. Over the Ti and the TiN layer, a releasing layer of an amorphous alloy containing 35.0 atomic % of Nb, 40.4 atomic % of W, and 24.6 atomic % of Ni was deposited to a thickness of 200 nm.

For the lower die, a Ti layer and a TiN layer were deposited to a total thickness of 1.2 μm on a cemented carbide J05 die (manufactured by Fuji Die) cut and polished into a concave shape having an outer diameter of 18 mm and a curvature radium of 22 mm. Over the Ti and the TiN layer, a releasing layer of an amorphous alloy containing 35.0 atomic % of Nb, 40.4 atomic % of W, and 24.6 atomic % of Ni was deposited to a thickness of 200 nm.

The resulting amorphous alloy film had a hardness of 15.9 GPa. The result of X-ray diffraction analysis showed that the film was amorphous. Furthermore, the dies were heated at 500° C. for 100 hours with a SiC heater in a chamber evacuated to $1.5 \times 10^{-5}$ Pa. It was shown that the alloy films maintained the amorphous structure thereof even after being heated.

A glass preform containing 13.5 mol % of CaO, 13.55 mol % of SrO, 9.08 mol % of $P_2O_5$, 7.86 mol % of $Al_2O_3$, 9.10 mol % of BaO, 5.57 mol % of MgO, 0.03 mol % of $Na_2O$ and 43.86 mol % of F was subjected to molding using the resulting dies. The glass preform was molded into a shape by pressing at 510° C. for 1 minute.

After the molding, there were no defects, such as scratches or abrasion or fused glass, at the surfaces of the dies. Also, there were no flaws considered to be poor appearance in the molded glass. In Example 3-3, a glass preform containing a large amount of fluorine was able to be molded into a shape. This suggests that the releasing layer having the composition of Example 3-3 is resistant to corrosion.

Examples 3-4 to 3-23

In Examples 3-4 to 3-23, molding dies having amorphous alloy films were prepared in the same manner as in Example 3-1, except that the amorphous alloy films had the compositions shown in Table 3. The evaluation results are shown in Table 3.

Comparative Examples 3-1 to 3-6

In Comparative Examples 3-1 to 3-6, molding dies having Nb—W—Ni alloy films were prepared in the same manner as in Example 3-1, except that the alloy films had the compositions shown in Table 3. The evaluation results are shown in Table 3.

Evaluation

In Examples 3-1 to 3-23, each amorphous alloy film contained 7.5 atomic % to 52.9 atomic % of Nb, 16.4 atomic % to 47.0 atomic % of W, and 22.0 atomic % to 53.3 atomic % of Ni, as shown in Table 3. The deposited amorphous alloy films of Examples 3-1 to 3-23 were amorphous and exhibited high hardnesses. The molding dies having the releasing layers of the these amorphous alloys were able to be used for molding of glass containing a large amount of fluorine, thus exhibiting high corrosion resistance.

The amorphous alloy films of Examples 3-1 to 3-5 contained 35.0 atomic % to 41.7 atomic % of Nb, 35.4 atomic % to 40.4 atomic % of W, and 22.0 atomic % to 25.0 atomic % of Ni, as shown in Table 3. Even after being heated at 550° C., the amorphous alloy films of Examples 3-1 to 3-5 were amorphous and exhibited a high hardness, a high heat resistance and a high corrosion resistance.

In Comparative Examples 3-1 to 3-6, some of the alloy films were crystallized, and the other were amorphous, but exhibited a low hardness, as shown in Table 3.

It was shown that the amorphous alloys of Examples 3-1 to 3-23 can form a releasing layer having a hardness in the range of 13.3 GPa to 19.8 GPa for a molding die.

TABLE 3

| | Composition (atomic %) | | | Crystallinity | | Hardness (GPa) | |
|---|---|---|---|---|---|---|---|
| | Nb | W | Ni | After deposition | Before heating | After deposition | Before heating |
| Example 3-1 | 39.3 | 37.9 | 22.9 | Amorphous | Amorphous | 14.9 | 19.3 |
| Example 3-2 | 37.9 | 37.0 | 25.0 | Amorphous | Amorphous | 14.7 | 19.3 |
| Example 3-3 | 35.0 | 40.4 | 24.6 | Amorphous | Amorphous | 15.9 | 19.6 |
| Example 3-4 | 41.7 | 35.4 | 22.9 | Amorphous | Amorphous | 14.6 | 19.8 |
| Example 3-5 | 40.0 | 38.2 | 22.0 | Amorphous | Amorphous | 14.8 | 19.6 |
| Example 3-6 | 7.5 | 47.0 | 45.5 | Amorphous | — | 16.1 | — |
| Example 3-7 | 16.5 | 37.7 | 45.8 | Amorphous | — | 16.1 | — |
| Example 3-8 | 21.7 | 33.9 | 44.4 | Amorphous | — | 15.6 | — |
| Example 3-9 | 16.2 | 31.3 | 52.5 | Amorphous | — | 15.4 | — |
| Example 3-10 | 23.9 | 41.8 | 34.3 | Amorphous | — | 14.7 | — |
| Example 3-11 | 33.2 | 38.5 | 28.4 | Amorphous | — | 14.4 | — |
| Example 3-12 | 16.4 | 45.0 | 38.7 | Amorphous | — | 14.1 | — |
| Example 3-13 | 30.3 | 34.8 | 34.9 | Amorphous | — | 14.2 | — |
| Example 3-14 | 45.1 | 28.8 | 26.1 | Amorphous | — | 13.5 | — |
| Example 3-15 | 38.2 | 30.6 | 31.2 | Amorphous | — | 14.0 | — |
| Example 3-16 | 23.4 | 23.4 | 53.1 | Amorphous | — | 13.8 | — |
| Example 3-17 | 26.2 | 27.9 | 46.0 | Amorphous | — | 14.5 | — |
| Example 3-18 | 36.7 | 26.1 | 37.2 | Amorphous | — | 13.5 | — |
| Example 3-19 | 52.9 | 23.5 | 23.6 | Amorphous | — | 13.3 | — |
| Example 3-20 | 28.9 | 17.8 | 53.3 | Amorphous | — | 13.9 | — |
| Example 3-21 | 34.2 | 21.5 | 44.3 | Amorphous | — | 13.4 | — |
| Example 3-22 | 36.5 | 16.4 | 47.1 | Amorphous | — | 13.7 | — |
| Example 3-23 | 44.1 | 21.3 | 34.6 | Amorphous | — | 13.7 | — |
| Comparative Example 3-1 | 26.8 | 3.9 | 72.0 | Amorphous | — | 12.8 | — |
| Comparative Example 3-2 | 5.4 | 84.1 | 10.5 | Crystalline | — | — | — |
| Comparative Example 3-3 | 13.1 | 58.3 | 28.5 | Crystalline | — | — | — |
| Comparative Example 3-4 | 6.8 | 81.6 | 11.6 | Crystalline | — | — | — |

TABLE 3-continued

| | Composition (atomic %) | | | Crystallinity | | Hardness (GPa) | |
|---|---|---|---|---|---|---|---|
| | Nb | W | Ni | After deposition | Before heating | After deposition | Before heating |
| Comparative Example 3-5 | 16.0 | 7.8 | 76.2 | Crystalline | — | — | — |
| Comparative Example 3-6 | 11.6 | 3.7 | 84.7 | Crystalline | — | — | — |

The Nb—W—Ni amorphous alloy of the third embodiment and a die using the amorphous alloy are chemically stable and releasable, and have such a hardness that they cannot be scratched during molding operation. Accordingly, the molding die can be used for forming optical elements, such as lenses and prisms.

The third embodiment of the disclosure provides a chemically stable, hard amorphous alloy, and a die that is not easily damaged or scratched during molding. The third embodiment also provides a method for forming an optical element using the molding die, which is not easily damaged during molding.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-180509, 2014-180510, and 2014-180511, each filed Sep. 4, 2014, which are hereby incorporated by reference herein in their entirety.

What is claimed is:

1. An amorphous alloy comprising Ni and Nb,
wherein the amorphous alloy has
a composition containing Nb with a content in the range of 19.6 atomic % to 80.9 atomic %, Re with a content in the range of 7.4 atomic % to 59.2 atomic %, and Ni with a content in the range of 4.1 atomic % to 56.9 atomic %, and
wherein the sum of the contents of Nb, Re and Ni is 97.0 atomic % or more.

2. The amorphous alloy according to claim 1, wherein the Nb content is in the range of 47.2 atomic % to 70.0 atomic %, the Re content is in the range of 17.5 atomic % to 39.7 atomic %, and the Ni content is in the range of 5.8 atomic % to 29.4 atomic %.

3. The amorphous alloy according to claim 1, wherein the amorphous alloy has a strength of 13 GPa or higher.

4. A molding die comprising:
a die base; and
a releasing layer on the die base, the releasing layer being made of an amorphous alloy having
a composition containing Nb with a content in the range of 19.6 atomic % to 80.9 atomic %, Re with a content in the range of 7.4 atomic % to 59.2 atomic %, and Ni with a content in the range of 4.1 atomic % to 56.9 atomic %, and
wherein the sum of the contents of Nb, Re and Ni is 97.0 atomic % or more.

5. The molding die according to claim 4, wherein the releasing layer has a hardness in the range of 13.7 GPa to 17.9 GPa.

6. A method for forming an optical element, comprising:
molding a glass preform into a shape by pressing using a molding die including a die base and a releasing layer made of an amorphous alloy having
a composition containing Nb with a content in the range of 19.6 atomic % to 80.9 atomic %, Re with a content in the range of 7.4 atomic % to 59.2 atomic %, and Ni with a content in the range of 4.1 atomic % to 56.9 atomic %, and
wherein the sum of the contents of Nb, Re and Ni is 97.0 atomic % or more.

\* \* \* \* \*